United States Patent
Sun et al.

(10) Patent No.: US 10,414,892 B2
(45) Date of Patent: Sep. 17, 2019

(54) PROCESS FOR FOAMING POLYOLEFIN COMPOSITIONS USING A FLUORORESIN/AZODICARBONAMIDE MIXTURE AS A NUCLEATING AGENT

(71) Applicant: Dow Global Technologies LLC, Midland, MI (US)

(72) Inventors: Gangwei Sun, Shanghai (CN); Mohamed Esseghir, Lawrenceville, NJ (US); Chester J. Kmiec, Phillipsburg, NJ (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 15/528,694

(22) PCT Filed: Nov. 28, 2014

(86) PCT No.: PCT/CN2014/092557
§ 371 (c)(1),
(2) Date: May 22, 2017

(87) PCT Pub. No.: WO2016/082211
PCT Pub. Date: Jun. 2, 2016

(65) Prior Publication Data
US 2017/0275431 A1    Sep. 28, 2017

(51) Int. Cl.
| *C08J 9/00* | (2006.01) |
| *C08J 9/10* | (2006.01) |
| *C08J 9/12* | (2006.01) |
| *C08L 23/06* | (2006.01) |
| *H01B 3/44* | (2006.01) |
| *H01B 7/02* | (2006.01) |
| *C08K 5/23* | (2006.01) |
| *C08L 27/18* | (2006.01) |

(52) U.S. Cl.
CPC ............ *C08J 9/103* (2013.01); *C08J 9/0028* (2013.01); *C08J 9/0061* (2013.01); *C08J 9/122* (2013.01); *C08K 5/23* (2013.01); *C08L 23/06* (2013.01); *C08L 27/18* (2013.01); *H01B 3/441* (2013.01); *H01B 3/445* (2013.01); *H01B 7/02* (2013.01); *C08J 2201/022* (2013.01); *C08J 2201/024* (2013.01); *C08J 2201/03* (2013.01); *C08J 2203/04* (2013.01); *C08J 2203/06* (2013.01); *C08J 2203/184* (2013.01); *C08J 2205/044* (2013.01); *C08J 2207/06* (2013.01); *C08J 2323/06* (2013.01); *C08J 2423/06* (2013.01); *C08J 2427/18* (2013.01)

(58) Field of Classification Search
CPC ........ C08J 9/0028; C08J 9/0061; C08J 9/103; C08J 9/122; C08J 2201/022; C08J 2201/024; C08J 2201/03; C08J 2203/04; C08J 2203/06; C08J 2203/184; C08J 2205/044; C08J 2207/06; C08J 2323/06; C08J 2423/06; C08J 2427/18; C08K 5/23; C08L 23/06; C08L 27/18; H01B 3/441; H01B 3/445; H01B 7/02

See application file for complete search history.

(56) References Cited

U.S. PATENT DOCUMENTS

| 3,554,932 A | 1/1971 | Overcashier |
| 4,101,445 A | 7/1978 | Levine et al. |
| 4,302,565 A | 11/1981 | Goeke et al. |
| 4,394,460 A | 7/1983 | Chung et al. |
| 4,508,842 A | 4/1985 | Beran et al. |
| 4,937,299 A | 6/1990 | Ewen et al. |
| 5,032,621 A | 7/1991 | Buckmaster et al. |
| 5,180,754 A | 1/1993 | Morita et al. |
| 5,317,036 A | 5/1994 | Brady, III et al. |
| 5,332,793 A | 7/1994 | Cann |
| 5,342,907 A | 8/1994 | Cann et al. |
| 5,371,145 A | 12/1994 | Daniell et al. |
| 5,405,901 A | 4/1995 | Daniell et al. |
| 5,410,003 A | 4/1995 | Bai |
| 5,770,819 A | 6/1998 | Mehan |
| 5,837,173 A | 11/1998 | Vita et al. |
| 6,121,335 A | 9/2000 | Higashikubo et al. |
| 6,127,441 A | 10/2000 | Sakamoto |
| 6,284,810 B1 | 9/2001 | Burnham et al. |
| 6,335,490 B1 | 1/2002 | Higashikubo et al. |
| 6,492,596 B1 | 12/2002 | Higashikubo et al. |
| 6,512,013 B2 | 1/2003 | Hrivnak |
| 7,767,725 B2 | 8/2010 | Brix et al. |

(Continued)

FOREIGN PATENT DOCUMENTS

| DE | 203915 | * 11/1983 |
| JP | 2000344927 | 12/2000 |

(Continued)

OTHER PUBLICATIONS

JP2003-026840 Machine Translation, Jan. 2003.*
DD 2030915 Veb Leuna-Werke. Abstract, Nov. 1983.*

Primary Examiner — Irina S Zemel
(74) Attorney, Agent, or Firm — Husch Blackwell LLP

(57) ABSTRACT

The process of foaming a polyolefin, e.g., polyethylene, composition using as a nucleator a combination an azodicarbonamide (ADCA) and a fluororesin at a ADCA: fluororesin weight ratio of 60:40 to 20:80. The synergic effect between these two nucleating agents results in a higher nuclei density and a foamed product with a smaller cell size as compared to processes using and products produced by the use of neat PTFE or neat ADCA alone as the nucleating agent.

17 Claims, No Drawings

(56) References Cited

U.S. PATENT DOCUMENTS

| | | |
|---|---|---|
| 2004/0220287 A1 | 11/2004 | Champagne et al. |
| 2008/0242754 A1 | 10/2008 | Champagne et al. |
| 2009/0018225 A1 | 1/2009 | Gemmel et al. |
| 2010/0252947 A1 | 10/2010 | Brix et al. |
| 2013/0090398 A1 | 4/2013 | Glew et al. |

FOREIGN PATENT DOCUMENTS

| | | | |
|---|---|---|---|
| JP | 2003-026840 | * | 1/2003 |
| JP | 2003026842 A | | 1/2003 |
| JP | 2006339099 A | | 12/2006 |
| JP | 04879613 B2 | | 2/2010 |
| WO | 2006/094163 A1 | | 9/2006 |

* cited by examiner

PROCESS FOR FOAMING POLYOLEFIN COMPOSITIONS USING A FLUORORESIN/AZODICARBONAMIDE MIXTURE AS A NUCLEATING AGENT

FIELD OF THE INVENTION

This invention relates to a process of foaming compositions. In one aspect the invention relates to foaming polyolefin compositions using a fluororesin as a nucleating agent while in another aspect, the invention relates to the foamed composition made from the process. In yet another aspect, the invention relates to using the foamed compositions as an insulation layer in electric communication cables, particularly high frequency coaxial cables.

BACKGROUND OF THE INVENTION

Typically, the insulation layer of a high frequency telecom cable is produced by mixing a nucleating agent with a mixture of high density polyethylene (HDPE) and low density polyethylene (LDPE). The foamable materials are then extruded in the presence of a physical foaming agent, like gases such as nitrogen, carbon dioxide, chlorinated fluorocarbons, freons, helium, neon, argon, krypton, xenon, and radon, which is injected into the polymer melt inside of the extruder. Nucleating agents for the foaming can include but not limited to azodicarbonamide (ADCA) and 4,4'-oxybisbenzenesulfonylhydrazide (OBSH), which thermally decompose in an extruder and form a number of fine nuclei in the polymer melt. However, the byproducts of the decomposed ADCA and OBSH have a high polarity which are well known to have a significant negative effect on the electrical performance (dissipation factor) of the cable.

Compared to ADCA and OBSH, fluororesin powder, such as polytetrafluoroethylene (PTFE), is a nucleating agent that exhibits a significantly lesser effect on electrical performance and is free of the decomposition issues associated with ADCA and OBSH. PTFE has been and is currently used as a nucleating agent for foaming compositions for use as insulation in telecom cable but improvements are still desired, particularly with respect to dispersion of the nucleating agent within the foamable composition, i.e., the polymer matrix, and in the formation of small, uniformly sized cells within the foamed product.

U.S. Pat. No. 3,554,932A teaches that finely divided, solid fluororesins, such as PTFE, fluorinated ethylene-propylene (FEP), or particle carriers coated with a fluorocarbon functioned as nucleators for gas-injected, foamed thermoplastic. It also teaches that the particle size should not exceed 20 microns in diameter, and it should be used in an amount from 0.01% to 2% by weight.

CA2523861A1 teaches a low loss foam composition and cable, such as a coaxial cable. The foam composition is formed by heating an olefinic polymer, such as a high density polyethylene, medium density polyethylene, low density polyethylene, linear low density polyethylene, polypropylene, or a combination thereof, into a molten state composition, optionally with a nucleating agent. The molten mixture is extruded under pressure through a die with a blowing agent comprising an atmospheric gas, such as carbon dioxide, nitrogen or air, and a co-blowing agent. The nucleating agent is selected from the group consisting of: azobisformamide, azodicarbonamide and sodium carbonate, with or without citric acid, talc, calcium carbonate, mica and combinations thereof.

SUMMARY OF THE INVENTION

In one embodiment the invention is a process of foaming a polyolefin composition using as a nucleator a combination of an azodicarbonamide (ADCA) and a fluororesin and at an ADCA:fluororesin weight ratio of 60:40 to 20:80.

In one embodiment the invention is a polyolefin foam made by a process for foaming a polyolefin composition using as a nucleator a combination of an ADCA and a fluororesin and at an ADCA:fluororesin weight ratio of 60:40 to 20:80.

In one embodiment the invention is a cable comprising an insulation layer comprising foam made by a process of foaming a polyolefin composition using as a nucleator a combination of an ADCA and a fluororesin and at an ADCA:fluororesin weight ratio of 60:40 to 20:80.

In one embodiment the invention is a foamable composition comprising in weight percent based on the weight of the composition:
  (A) 45 to 95% HDPE;
  (B) 4 to 54% LDPE; and
  (C) 0.01 to 1% of a combination of an ADCA and a fluororesin and at an ADCA:fluororesin weight ratio of 60:40 to 20:80.

DETAILED DESCRIPTION OF THE PREFERRED EMBODIMENT

Definitions

Unless stated to the contrary, implicit from the context, or customary in the art, all parts and percents are based on weight and all test methods are current as of the filing date of this disclosure. For purposes of United States patent practice, the contents of any referenced patent, patent application or publication are incorporated by reference in their entirety (or its equivalent US version is so incorporated by reference) especially with respect to the disclosure of definitions (to the extent not inconsistent with any definitions specifically provided in this disclosure) and general knowledge in the art.

The numerical ranges in this disclosure are approximate unless otherwise indicated. Numerical ranges include all values from and including the lower and the upper values, in increments of one unit, provided that there is a separation of at least two units between any lower value and any higher value. As an example, if a compositional, physical or other property, such as, for example, tensile strength, elongation at break, etc., is from 100 to 1,000, then the intent is that all individual values, such as 100, 101, 102, etc., and sub ranges, such as 100 to 144, 155 to 170, 197 to 200, etc., are expressly enumerated. For ranges containing values which are less than one or containing fractional numbers greater than one (e.g., 1.1, 1.5, etc.), one unit is considered to be 0.0001, 0.001, 0.01 or 0.1, as appropriate. For ranges containing single digit numbers less than ten (e.g., 1 to 5), one unit is typically considered to be 0.1. These are only examples of what is specifically intended, and all possible combinations of numerical values between the lowest value and the highest value enumerated, are to be considered to be expressly stated in this disclosure. Numerical ranges are provided within this disclosure for, among other things, particle size and the amount of individual ingredients in a mixture.

"Comprising," "including," "having" and like terms are not intended to exclude the presence of any additional component, step or procedure, whether or not the same is specifically disclosed. In order to avoid any doubt, all processes claimed through use of the term "comprising" may include one or more additional steps, pieces of equipment or component parts, and/or materials unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed. The term "or," unless stated otherwise, refers to the listed members individually as well as in any combination.

"Composition" and like terms mean a mixture of two or more materials.

"Polyolefin composition" and like terms mean, in the context of this invention, a composition comprising at least one polyolefin.

"Interpolymer" means a polymer prepared by the polymerization of at least two different monomers. This generic term includes copolymers, usually employed to refer to polymers prepared from two different monomers, and polymers prepared from more than two different monomers, e.g., terpolymers, tetrapolymers, etc.

"Nucleator", "nucleating agent" and like terms mean, in the context of this invention, a substance, typically a small particle, that provides a nucleation site or location for bubble formation within a polymer melt. These nucleating agents are used to enhance the cell structure of foaming polymers.

"Agglomerate" and like terms mean a collection of two or more particles group together to constitute a whole. Agglomerates can be of various sizes. An agglomerate will always be larger than the particles from which it is made, but some particles not associated with a particular agglomerate can be larger than the agglomerate. In the practice of this invention, agglomerates are typically and preferably less than one micron is size, more preferably less than 0.5 micron and even more preferably less than 0.3 micron, in size.

"Particle" and like terms mean a unitary mass. Particles can be of various sizes. A fluororesin particle, e.g., a PTFE particle, is a unitary mass of fluororesin. Two or more fluororesin particles grouped together, i.e., in contact with one another, form a fluororesin agglomerate. The fluororesin particles of this invention are typically and preferably less than one micron is size, more preferably less than 0.5 micron and even more preferably less than 0.3 micron, in size.

"Unagglomerated particle" and like terms mean a particle not associated with another particle of like kind. Unagglomerated particles include both particles that have dissociated from an agglomerate, and particles that have not been associated with an agglomerate.

"Masterbatch" and like terms mean a concentrated mixture of additives in a carrier resin. In the context of this invention, a masterbatch comprises a concentrated mixture of fluororesin nucleator in a polyolefin resin. The masterbatch allows for an efficient addition and dispersion of the nucleator to and in the polyolefin. The manufacture and use of masterbatches are well known to those skilled in the art of manufacturing and fabricating plastics and foam articles.

Polyolefins

"Polyolefin" and like terms means a polymer derived from one or more simple olefin monomers, e.g., ethylene, propylene, 1-butene, 1-hexene, 1-octene and the like. The olefin monomers can be substituted or unsubstituted and if substituted, the substituents can vary widely. If the polyolefin is to contain unsaturation, then preferably at least one of the comonomers is at least one nonconjugated diene such as 1,7-octadiene, 1,9-decadiene, 1,11-dodecadiene, 1,13-tetradecadiene, 7-methyl-1,6-octadiene, 9-methyl-1,8-decadiene and the like. Many polyolefins are thermoplastic. Polyolefins include but are not limited to polyethylene, polypropylene, polybutene, polyisoprene and their various interpolymers.

In one embodiment of the invention the polyolefin is at least one, preferably a blend of, high density polyethylene (HDPE) and low density polyethylene (LDPE). The HDPE resins that can be used in the practice of this invention are well known, commercially available, and can be prepared with either Ziegler-Natta, chromium-based, constrained geometry or metallocene catalysts in slurry reactors, gas phase reactors or solution reactors. HDPE, as used herein, is an ethylene-based homopolymer or interpolymer having a density of at least 0.94 g/cc, or from at least 0.94 g/cc to 0.98 g/cc, and a melt index from 0.1 g/10 min to 25 g/10 min.

HDPE can comprise ethylene and one or more $C_3$-$C_{20}$ α-olefin comonomers. The comonomer(s) can be linear or branched. Nonlimiting examples of suitable comonomers include propylene, 1-butene, 1 pentene, 4-methyl-1-pentene, 1-hexene, and 1-octene. HDPE interpolymer includes at least 50 percent by weight units derived from ethylene, i.e., polymerized ethylene, or at least 70 percent by weight, or at least 80 percent by weight, or at least 85 percent by weight, or at least 90 weight percent, or at least 95 percent by weight ethylene in polymerized form.

In an embodiment, HDPE is a homopolymer or an ethylene/α-olefin copolymer with a density from 0.94 g/cc to 0.98 g/cc, and a melt index from 0.1 g/10 min to 10 g/10 min. In an embodiment, the HDPE has a density from 0.960 g/cc to 0.980 g/cc, and a melt index from 0.1 g/10 min to 10 g/10 min. In an embodiment, HDPE has a density from 0.96 g/cc to 0.97 g/cc and a melt index from 0.1 g/10 min to 10 g/min. In an embodiment, the HDPE has a density from 0.96 g/cc to 0.98 g/cc and a melt index from 1.0 g/10 min to 10.0 g/10 min.

Nonlimiting examples of suitable, commercially available HDPE include but are not limited to DOW High Density Polyethylene resins and CONTINUUM™ and UNIVAL™ high density polyethylene resins, ELITE™ 5960G, HDPE KT 10000 UE, HDPE KS 10100 UE and HDPE 35057E, each available from The Dow Chemical Company Midland, Mich., USA; SURPASS™ available from Nova Chemicals Corporation, Calgary, Alberta, Canada; BS2581 available from Borealis; Hostalen ACP 5831D available from Lyondell/Basell; RIGIDEX® HD5502S available from INEOS Olefins & Polymers Europe; SABIC®B5823 and SABIC®B5421 available from Sabic; and HDPE 5802 and BM593 available from Total.

The LDPE resins that can be used in the practice of this invention are also well known, commercially available, and made by any one of a wide variety of processes including, but not limited to, solution, gas or slurry phase, and high pressure tube or autoclave. The polyethylene also can be homogeneous or heterogeneous with respect to comonomer distribution. The homogeneous polyethylenes usually have an essentially uniform comonomer distribution. The heterogeneous polyethylenes, on the other hand, do not have a uniform comonomer distribution. In one embodiment the LDPE is a linear low density polyethylene (LLDPE). In one embodiment the LDPE is a very low density polyethylene (VLDPE).

The polyethylene can have a broad molecular weight distribution, characterized by a polydispersity (Mw/Mn) greater than 3.5, or a narrow molecular weight distribution, characterized by a polydispersity (Mw/Mn) in the range of about 1.5 to about 3.5. Mw is defined as weight average molecular weight, and Mn is defined as number average molecular weight. They can be a single type of polyethylene or a blend or mixture of more than one type of polyethylene. Thus, it may be characterized by either single or multiple DSC melting points. The polyethylenes can have a density in the range of 0.865 to 0.930 gram per cubic centimeter (g/cc), and preferably have a density in the range of 0.9000 to 0.925 g/cc. They also can have a melt index (MI, $I_2$) in the range of 0.1 to 50 grams per 10 minute (g/10 min). Typical catalyst systems, which can be used to prepare these polyethylenes, are magnesium/titanium based catalyst systems, which can be exemplified by the catalyst system described in U.S. Pat. No. 4,302,565 (heterogeneous polyethylenes); vanadium based catalyst systems such as those described in U.S. Pat. No. 4,508,842 (heterogeneous polyethylenes) and U.S. Pat. Nos. 5,332,793; 5,342,907; and 5,410,003 (homogeneous polyethylenes); a chromium based catalyst system such as that described in U.S. Pat. No. 4,101,445; a metallocene catalyst system such as that described in U.S. Pat. Nos. 4,937,299 and 5,317,036 (homogeneous polyethylenes); or other transition metal catalyst systems. Many of these catalyst systems are often referred to as Ziegler-Natta catalyst systems or Phillips catalyst systems. Catalyst systems, which use chromium or molybdenum oxides on silica-alumina supports, can be included here. Typical processes for preparing the polyethylenes are also described in the aforementioned patents. Typical in situ polyethylene blends and processes and catalyst systems for providing same are described in U.S. Pat. Nos. 5,371,145 and 5,405,901. The various polyethylenes can include low density homopolymers of ethylene made by high pressure processes (HP-LDPE), and high density polyethylene (HDPE) having a density greater than 0.940 g/cc. A conventional high pressure process is described in *Introduction to Polymer Chemistry*, Stille, Wiley and Sons, New York, 1962, pages 149 to 151. The high pressure processes are typically free radical initiated polymerizations conducted in a tubular reactor or a stirred autoclave. In the stirred autoclave, the pressure is in the range of about 10,000 to 30,000 psi (about 69 to about 207 MPa) and the temperature is in the range of about 175° C. to about 250° C., and in the tubular reactor, the pressure is in the range of about 25,000 to about 45,000 psi (about 170 to about 310 MPa) and the temperature is in the range of about 200° C. to about 350° C.

Commercially available LDPE resins include but are not limited to DOW Low Density Polyethylene resins available from The Dow Chemical Company such as DFDB-1258 NT and, in general, any fractional melt flow index (MH) resin for use in heavy duty bags or agricultural films such as those available from Borealis, Basel, Sabic and others.

The HDPE/LDPE mixtures or blends of the present invention may be prepared by any suitable means known in the art such as, for example, dry blending in a pelletized form in desired proportions followed by melt blending in an apparatus such as a screw extruder or a BANBURY™ mixer. Dry blended pellets may be directly melt processed into a final solid state article by, for example, extrusion or injection molding. The blends may also be made by direct polymerization. Direct polymerization may use, for example, one or more catalysts in a single reactor or two or more reactors in series or parallel and vary at least one of operating conditions, monomer mixtures and catalyst choice.

The amount of HDPE in the polyolefin composition, based on the weight of the composition, is typically at least 45 weight percent (wt %), more typically at least 55 wt % and even more typically at least 60 wt %. The amount of HDPE in the polyolefin composition, based on the weight of the composition, typically does not exceed 95 wt %, more typically it does not exceed 85 wt % and even more typically it does not exceed 80 wt %.

The amount of LDPE in the polyolefin composition, based on the weight of the composition, is typically at least 4 weight percent (wt %), more typically at least 14 wt % and even more typically at least 19 wt %. The amount of LDPE in the polyolefin composition, based on the weight of the composition, typically does not exceed 54 wt %, more typically it does not exceed 44 wt % and even more typically it does not exceed 39 wt %.

The HDPE component of the blend can comprise two or more grades of HDPE, and the LDPE component of the blend can comprise two or more grades of LDPE. The HDPE/LDPE blend typically has an $I_2$ of 0.1 to 4 g/10 min, more typically 0.15 to 4 g/10 min.

Nucleator

Fluororesin Component

Fluororesin particles, particularly those of less than a micron in size, tend to agglomerate. Some commercially available fluororesin powders comprise a high concentration of agglomerates of at least 5 microns (µm) in size, e.g., diameter. Typically the size of the agglomerates range from 4 to 50 microns, more typically from 5 to 20 microns and even more typically from 5 to 15 microns. Typically, the amount of fluororesin agglomerates of at least 5 µm in size in these powders is at least 80%, more typically at least 82%, and even more typically at least 85%. These powders do not disperse well in many polyolefins, e.g., HDPE and/or LDPE.

While agglomerated fluororesin particles, i.e., agglomerates, as described above can be used in the practice of this invention, in one embodiment unagglomerated particles are used. In one embodiment the fluororesin components of the nucleators used in this invention are unagglomerated particles of less than a micron in size, or less than 0.5 micron in size, or less than 0.3 micron in size, which may be commingled with agglomerates that were either originally submicron in size or were reduced in size from greater than a micron to less than a micron. In one embodiment the fluororesin component of the nucleator used in the practice of the invention comprises less than 10 wt %, or 9 wt %, or 8 wt %, or 7 wt %, or 6 wt %, or 5 wt %, or 4 wt %, or 3 wt %, or 2 wt %, or 1 wt % of agglomerates greater than a micron in size, but the smaller the amount of such agglomerates, and thus the greater the amount of submicron particles and submicron agglomerates, the better the dispersion of the fluororesin in the polyolefin, and the more evenly distributed are the cell sizes in the foamed product.

Agglomerated particles can be separated from one another by any conventional means, e.g., grinding, mixing or stirring (typically at a relatively high speed), etc. In one embodiment a fluororesin comprising agglomerates of one micron or greater, typically of 3, or 4, or 5 microns or greater, is subjected to any procedure, treatment, etc. that will reduce the majority, preferably 60%, 70%, 80%, 90% or more, of the such agglomerates to either unagglomerated particles of less than a micron in size, or agglomerates of less than a micron in size before the nucleator is mixed with polyolefin.

In one embodiment the fluororesin component of the nucleator used in the practice of this invention and comprising agglomerates of one micron or greater, typically of 3, or 4, or 5 microns or greater, is first mixed with the polyolefin, with or without the ADCA component of the nucleator, to form a masterbatch, and then the masterbatch is subjected to any procedure, treatment, etc. that will reduce the majority, preferably 60%, 70%, 80%, 90% or more, of the such agglomerates to either unagglomerated particles of less than a micron in size, or agglomerates of less than a micron in size. Typically the masterbatch comprises from 1 to 50, more typically from 5 to 50 and even more typically from 15 to 30 weight percent (wt %) fluororesin, and from 50 to 99, more typically from 60 to 95 and even more typically from 70 to 85 wt % polyolefin. After the masterbatch is subjected to the fluororesin size reduction procedure, treatment, etc., the masterbatch is mixed with the ADCA component of the nucleator (if it does not already comprise that component) and the polyolefin to be foamed under conditions and for a sufficient period of time to uniformly disperse the unagglomerated particles and agglomerates within the polyolefin before the start of the foaming process.

In one embodiment the fluororesin comprising agglomerates of one micron or greater, typically of 3, or 4, or 5 microns or greater, is first mixed with the polyolefin, with or without the ADCA component of the nucleator, in the amount desired for the practice of the foaming process, and then the polyolefin is subjected to any procedure, treatment, etc. for a sufficient amount of time that will both (1) reduce the majority, preferably 60%, 70%, 80%, 90% or more, of the such agglomerates to either unagglomerated particles of less than a micron in size, or agglomerates of less than a micron in size, and (2) substantially uniformly disperse these unagglomerated particles and reduced agglomerates within the polyolefin before the foaming process commences. The ADCA component of the nucleator can be added to the polyolefin before, simultaneously with, or after the addition of the fluororesin, and before or after the agglomerates of the fluororesin are subjected to size reduction.

The nucleator, preferably PTFE comprising particles and agglomerates of less than a micron in size, can be added to the polyolefin composition comprising or consisting essentially of HDPE and LDPE, by any conventional means. The nucleator can be added neat, in combination with one or more other additives, e.g., antioxidant, cell stabilizer, etc., or as part of a masterbatch. The nucleator is mixed with the polyolefin composition to achieve an essentially homogeneous dispersion of nucleator in the polyolefin composition and to this end, batch mixing, e.g., through the use of a BUSS™ kneader, is typically preferred to mixing in an extruder. If the nucleator is first mixed with the polyolefin composition in an extruder, then it is typically added to the polyolefin composition prior to injection of the gas for foaming.

Particle size can be determined by any method known in the art. In one embodiment, the determination of particle size and proportion (% by number) of fluororesin powder can be determined as follows. A dispersion comprising a fluororesin powder obtained by a dispersing treatment for about 2 minutes under ultrasonication of about 35-40 kHz and ethanol, wherein the fluororesin powder is contained in an amount to make a laser permeation (proportion of output light to incident light) of the dispersion 70-95%, is subjected to a microtrack particle size analyzer under relative refraction (determination is done based on the ratio of diffraction ratio (about 0.99) of fluororesin powder to that of ethanol or according to the measure of the above-mentioned particle size analyzer which is the nearest to the ratio (e.g., 1.02)) and flow type cell measurement mode to determine particle size ($D_1, D_2, D_3 \ldots$) of individual particles and the number ($N_1, N_2, N_3 \ldots$) of particles having each particle size based on the optical diffraction of the laser. In this case, the particle size (D) of individual particles is automatically measured by the microtrack particle size analyzer wherein particles having various shapes are measured in terms of the diameters of the corresponding spheres. Therefore, the proportion (% by number) of the particle size $D_1$ is expressed by the percentage of the number of these particles ($N_1$) to the number of the entire particles ($\Sigma N$). The proportion of the particles having a particle size of 0.1-0.5 µm is expressed by the percentage of the number of the particles having a particle size of 0.1-0.5 µm to the total number of the existing particles ($\Sigma N$). Similarly, the proportion of the particles having a particle size of not less than 5 µm is expressed by the percentage of the number of the particles having a particle size of not less than 5 µm to the total number of the existing particles ($\Sigma N$). On the other hand, the average particle size of the nucleator of the present invention can be calculated using the total number of existing particles ($\Sigma N$) and the total of the product of the cube of the particle size of respective particles and the total number of existing particles ($\Sigma ND^3$), according to the following formula $$\text{Average Particle Size (µm)} = (\Sigma ND^3 / \Sigma N)^{1/3}$$

Calculation of particle size is further illustrated in U.S. Pat. No. 6,121,335. The calculation of agglomerate size is determined in the same manner as that described above for particle size determination.

While the shape of the fluororesin particles and agglomerates is not particularly limited, it is preferable that the particles and agglomerates are primarily sphere-like in shape to produce a foam comprising fine cells and superior in uniform foaming.

Fluororesin/ADCA Mixture Nucleator

In one embodiment of the invention, the nucleator is a mixture of a fluororesin, preferably PTFE, and azodicarbonamide (ADCA). The weight ratio of ADCA to fluororesin is typically from 60/40 to 20/80, more typically from 55/45 to 20/80 and even more typically from 50/50 to 25/75. The particle size distribution and morphology, e.g., agglomerated or unagglomerated, of the fluororesin can vary in this embodiment, but preferably both the particle size distribution and morphology of the fluororesin is as described above. The amount of the nucleator of this embodiment, i.e., fluororesin and ADCA, that is added to the polyolefin composition is typically from 0.01 to 1 wt %, more typically from 0.05 to 0.6 wt % and even more typically from 0.1 to 0.3 wt % based on the weight of the polyolefin composition.

The nucleator can be added to the polyolefin composition by any conventional means. The nucleator can be added neat, in combination with one or more other additives, e.g., antioxidant, cell stabilizer, etc., or as part of a masterbatch. The nucleator is typically added as a mixture of fluororesin and ADCA, but the fluororesin and ADCA can be added separately and the mixture formed in situ within the polyolefin composition. The nucleator is mixed with the polyolefin composition to achieve an essentially homogeneous dispersion of nucleator in the polyolefin composition and to this end, batch mixing, e.g., through the use of a BUSS™ kneader, is typically preferred to mixing in an extruder. If the nucleator is first mixed with the polyolefin composition in an extruder, then it typically added to the polyolefin composition prior to injection of the gas for foaming.

Use of the fluororesin/ADCA nucleator produces a higher performance product as compared to a product produced using a fluororesin, particularly PTFE, alone as the nucleator. The products exhibit enhanced properties in terms of expansion ratio, cell size and cell size uniformity as well as surface smoothness in this hybrid nucleating agent, the fluororesin is the "passive" nucleating agent and azodicarbonamide is the "active" nucleating agent. The synergic effect between these two nucleating agents results in a higher nuclei density and a foamed product with smaller cell size as compared to processes using and products produced by the use of neat PTFE or neat ADCA alone as the nucleating agent.

Additives

The polyolefin composition used in this invention may contain one or more additives as necessary or desired. Representative additives include but are not limited to, processing aids, lubricants, stabilizers antioxidants), foaming aids, nucleating agents, surfactants, flow aids, viscosity control agents, coloring agents, copper inhibitors and the like. These additives can be added to the polymer(s) either before or during processing. The amount of any particular additive in the polyolefin composition is typically from 0.01 to 1 wt %, more typically from 0.01 to 0.5 wt % and even more typically from 0.01 to 0.3 wt %, and the total amount of additives in the polyolefin composition, if present at all, is typically from 0.01 to 5 wt %, more typically from 0.01 to 2 wt % and even more typically from 0.01 to 1 wt %.

Foaming Agent

The foaming agent is one or more suitable for the extrusion temperature, foaming conditions, foam forming method and the like. When an insulating foam layer in the final form is to be formed simultaneously with extrusion forming, for example, an inert gas such as nitrogen, a carbon gas (e.g., CO, $CO_2$, etc.), helium, argon and the like, hydrocarbon such as methane, propane, butane, pentane and the like, halogenated hydrocarbons such as dichlorodifluoromethane, dichloromonofluoromethane, monochlorodifluoromethane, trichloromonofluoromethane, monochloropentafluoroethane, trichlorotrifluoroethane and the like are used. The amount of the foaming agent to be used can vary. Typically, it is 0.001-0.1 part by weight, more typically 0.005-0.05 part by weight, per 100 parts by weight of the polyolefin composition to be foamed. The foaming agent may be mixed with an organic polymer to be foamed in advance or may be supplied into an extruder from a foaming agent supply opening formed on the barrel of the extruder.

Foaming Process

The polyolefin composition of this invention is foamed using known methods and known equipment. Typically, a foam is produced by extruding the polyolefin composition containing a nucleator using an extruder operated under foaming extrusion conditions, e.g., injection of a foaming agent while the composition is in a high pressure zone and then extruding the composition to a low pressure zone. Foaming process are further described by C. P. Park in *Polyolefin Foam*, Chapter 9, *Handbook of Polymer Foams and Technology*, edited by D. Klempner and K. C. Frisch, Hanser Publishers (1991).

The polyolefin composition of this invention is foamed using known methods and known equipment. Typically, a foam is produced by extruding the polyolefin composition containing a nucleator using an extruder operated under foaming extrusion conditions, e.g., injection of a foaming agent while the composition is in a high pressure zone and then extruding the composition to a low pressure zone. Foaming process are further described by C. P. Park in *Polyolefin Foam*, Chapter 9, *Handbook of Polymer Foams and Technology*, edited by D. Klempner and K. C. Frisch, Hanser Publishers (1991).

In one embodiment, a typical extrusion foaming process uses an atmospheric gas (e.g., $CO_2$) to produce a foamed cable insulation as described in CA 2 523 861 C, Low Loss Foam Composition and Cable Having Low Loss Foam Layer. Dissolution of the foaming gas into the polymer melt is governed by Henry's law as reported for example in the work of H. Zhang (below) and others. Solubility is a function of the saturation pressure and the Henry's law constant, which itself is a function of temperature. /Zhang_Hongtao_201011_MASc_thesis.pdf. Also see *Foam Extrusion: Principles and Practice* by Shau-Tarng Lee, editor. The MuCell® microcellular foam injection molding technology is an example of a commercially practiced foaming process, and it is described generally in U.S. Pat. No. 6,284,810.

Given the above on the importance of adequate pressure control during foaming extrusion, a suitable process would be the one commercially referred to as the MuCell process, in which adequate pressures are built via specific hardware design, for effective nucleation as reported in U.S. Pat. No. 6,84,810B1. The method disclosed in this publication relies solely on high pressure drops (dP/dt) for self-nucleation of the foaming gas in the absence of an "auxiliary nucleating agent" (Col. 4, line 25-30).

Embodiments of the Invention

In one embodiment the polyolefin composition comprises at least two polyolefins.

In one embodiment the polyolefin composition comprises two polyolefin.

In one embodiment the polyolefins of the polyolefin composition are an HDPE and a LDPE.

In one embodiment the polyolefin composition includes at least one nucleator.

In one embodiment the polyolefin composition includes at least one of an antioxidant and a cell stabilizer.

In one embodiment the polyolefin composition comprises HDPE, LDPE and a nucleator of PTFE and ADCA.

Specific Embodiments

The following experiments are provided to illustrate various embodiments of the invention. They are not intended to limit the invention as otherwise described and claimed. All numerical values are approximate.

EXAMPLES 1-5 AND COMPARATIVE EXAMPLES 1-2

Materials

LDPE-1 is a low density polyethylene (LDPE) with an MI of 2.35 g/10 min (ASTM D-1238, (190° C./2.16 kg)) and a density of 0.92 g/cc (ASTM D-792).

PTFE is ZONYL™ MP 1400, a white, free-flowing PTFE with an average particle size of 10 μm and available from DuPont.

LDPE-2 is DFDB-1258 NT, a low density polyethylene (LDPE) with an MI of 6 g/10 min (ASTM D-1238, (190° C./2.16 kg)) and a density of 0.922 g/cc (ASTM D-792) available from The Dow Chemical Company.

HDPE is DGDA-6944 NT, a high density polyethylene (HDPE) with an MI of 8 g/10 min (ASTM D-1238, (190° C./2.16 kg)) and a density of 0.965 g/cc (ASTM D-792) available from The Dow Chemical Company.

MB-1 is 10 wt % ADCA in LDPE-1.

MB-2 is 10 wt % PTFE in LDPE-1 with an MI of 2.35 g/10 min (ASTM D-1238, (190° C./2.16 kg)) and a density of 0.920 g/cc (ASTM D-792).

Preparation of Nucleator Masterbatch

The preparation of a nucleating agent masterbatch is conducted on single-screw extruder at a temperature of 140° C. Prior to extrusion, MB-1 and MB-2 are dry blended. The ratio of MB-1 to MB-2 is adjusted from 60/40 to 20/80.

Foaming Process

The physical foaming experiment is conducted on a single-screw extruder with gas injection system. The screw diameter is 50 millimeters (mm) with a length to diameter (L/D) ratio of 40. The gas injection point is located at the middle of screw with $CO_2$ as the blowing agent. The temperature profile is 140/175/180(gas injection)/170/145 (static mixer)/143(die). HDPE, LDPE-2 and nucleating agents MB-1 and MB-2 are dry blended first then fed on the upstream of the extruder. The foamed product is obtained in the shape of a rod. In one embodiment MB-1 and MB-2 are compounded into a hybrid nucleating agent MB, and the MB is then dry blended prior to being fed into the foaming extruder. In one embodiment HDPE, LDPE-2 and nucleating agents MB-1 and MB-2 are compounded into an "all in one" formulation then foamed in the gas injected extruder.

Characterization of Extruded Foam Rod

Expansion Ratio

The expansion ratio is calculated based on the density of sample before and after foaming. The density of the foamed article and solid plaque are measured according to ASTM D792.

Expansion ratio=$(1-\rho_{foam}/\rho_{solid})*100\%$

Average Cell Size

The foamed sample is fractured utilizing liquid nitrogen and then slices are cut out using a razor blade. The slices are coated with platinum using an EMITECH™ K575X coater before scanning electron microscopy (SEM) analysis. The SEM images are acquired on a FEI Nova NanoSEM 630 SEM by Everhart-Thornley detector (ETD) and Through Lens Detector (TLD) at an accelerating voltage of 5 kV, working distance around 6.5 mm and spot size of 5. The average cell size is obtained through the analysis of the SEM photographs.

The cell density of the foamed article can be calculated by the following Equation:

$$N_f = \left(\frac{n_c M_c^2}{A_c}\right)^{3/2}$$

$N_f$ represents cell number per cubic centimeter volume in the foamed article, $n_c$ is the cell number in the view area of SEM picture, $A_c$ is the area of SEM picture, and $M_c$ is the magnification.

D, which is the average the cell size, can be calculated by the following Equation:

$$D = \left(\frac{6V_t^2}{\pi N_f}\right)^{1/3}$$

Where, $V_t$ represents that expansion ratio of foamed article.

DF measurements: Dissipation Factor measurement is conducted on a High Frequency Split Post Dielectric Resonator at a frequency of 2.47 GHz on 50 mil compression molded plaques. Before measurements, the plaques are conditioned for 24 hours at room temperature in a desiccant chamber.

The results are reported in Table 1.

TABLE 1

Foaming Performance of Hybrid Nucleating Agents

|  | CE1 | CE2 | IE1 | IE2 | IE3 | IE4 | IE5 |
| --- | --- | --- | --- | --- | --- | --- | --- |
| HDPE | 70 | 70 | 70 | 70 | 70 | 70 | 70 |
| LDPE-2 | 28.5 | 28.5 | 28.5 | 28.5 | 28.5 | 28.5 | 28.5 |
| MB-1 |  | 1.5 | 0.9 | 0.8 | 0.6 | 0.4 | 0.3 |
| MB-2 | 1.5 |  | 0.6 | 0.7 | 0.9 | 1.1 | 1.2 |
| Total | 100 | 100 | 100 | 100 | 100 | 100 | 100 |
| Porosity, % | 77.1 | 80.8 | 83.6 | 81.3 | 78.4 | 79.3 | 78.4 |
| Cell size, mm | 0.35-0.55 | 0.25-0.45 | 0.27-0.65 | 0.25-0.45 | 0.30-0.40 | 0.30-0.45 | 0.35-0.46 |
| Avg. cell size, um | 0.478 | 0.392 | 0.423 | 0.383 | 0.343 | 0.364 | 0.407 |
| DF of bulk (unexpanded) | 1.0160E−04 | 1.0020E−04 | 1.0590E−04 | N/A | 9.9350E−05 | N/A | 1.0178E−04 |

The results of Table 1 show that the addition of ADCA led to a better foaming than PTFE (MP1400) alone. In the hybrid system, the obvious synergy effect between PTFE and ADCA on foaming performance is found when the ADCA/PTFE ratio varied from 60/40 to 20/80, with a preferred ratio range from 55/45 to 20/80, and an even more preferred range from 50/50 to 25/75. When the ratio of ADCA is higher than 60% in the hybrid nucleating agent, no synergy effect is observed.

The invention claimed is:

1. A process of foaming a polyolefin composition comprising:
    (A) providing a fluororesin powder composed of agglomerates and particles, wherein the powder comprises 80% or more of agglomerates and particles from 5 microns to 20 microns in size, based on the total number of agglomerates and particles in the powder;
    (B) mixing the fluororesin powder of (A) with a polyolefin to form a mixture;
    (C) reducing the size of the agglomerates of the mixture of (B) to produce a fluororesin powder comprising 80% or more of particles or agglomerates of less than 1 micron in size, based on the total number of agglomerates and particles in the powder;
    (D) forming a foamable composition comprising (i) a nucleator comprising a combination of an azodicarbonamide (ADCA) and the fluororesin powder of (C) at a ADCA:fluororesin weight ratio of 60:40 to 20:80 and (ii) the polyolefin; and
    (E) foaming the foamable composition.

2. The process of claim 1 in which the polyolefin of the polyolefin composition comprises high density polyethylene (HDPE) and low density polyethylene (LDPE).

3. The process of claim 1 in which the polyolefin of the polyolefin composition consists of HDPE and LDPE.

4. The process of claim 3 in which the HDPE comprises 45 to 95 weight percent of the polyolefin composition based on the weight of the polyolefin composition and the LDPE comprises 4 to 54 weight percent of the polyolefin composition based on the weight of the polyolefin composition.

5. The process of claim 4 in which the fluororesin comprises polytetrafluoroethylene (PTFE).

6. The process of claim 5 in which the fluororesin is PTFE.

7. The process of claim 6 in which the combination of PTFE and ADCA is present in the polyolefin composition in an amount of 0.01 to 1 wt % based on the weight of the polyolefin composition.

8. The process of claim 7 in which the polyolefin composition further comprises at least one of an antioxidant and a cell stabilizer.

9. The process of claim 4 in which the HDPE has a density from 0.960 g/cc to 0.980 g/cc.

10. The process of claim 9 in which a blend of the HDPE and the LDPE has a melt index, $I_2$, from 0.1 g/10 min to 4 g/10 min.

11. The process of claim 1 comprising mixing the fluororesin powder of (A) with the ADCA and the polyolefin to form the mixture.

12. The process of claim 1 in which the mixture of (B) is a masterbatch consisting of the fluororesin powder of (A) and the polyolefin, the process further comprising, after reducing the size of the agglomerates, mixing the masterbatch with the ADCA and the polyolefin.

13. A process of foaming a polyolefin composition comprising:
(A) providing a first masterbatch comprising a low density polyethylene (LDPE) and an azodicarbonamide (ADCA);
(B) providing a second masterbatch comprising the LDPE and a polytetrafluoroethylene (PTFE) powder composed of agglomerates and particles, wherein the powder comprises 80% or more of agglomerates and particles from 5 microns to 20 microns in size, based on the total number of agglomerates and particles in the powder;
(C) mixing the first masterbatch with the second masterbatch to form a nucleator masterbatch, the nucleator masterbatch having an ADCA:PTFE weight ratio from 60:40 to 20:80;
(D) reducing the size of the agglomerates of the nucleator masterbatch to produce a PTFE powder comprising 80% or more of particles or agglomerates of less than 1 micron in size, based on the total number of agglomerates and particles in the powder;
(E) mixing the nucleator masterbatch of (D) with a high density polyethylene (HDPE) and LDPE to form a foamable composition; and
(F) foaming the foamable composition.

14. The process of claim 13 comprising forming a nucleator masterbatch consisting of the LDPE, the ADCA, and the PTFE powder.

15. The process of claim 13 comprising dry blending the first masterbatch with the second masterbatch to form a dry blend, and then extruding the dry blend to form the nucleator masterbatch.

16. The process of claim 13 comprising dry blending the nucleator masterbatch of (D) with LDPE and HDPE to form the polyolefin composition.

17. The process of claim 16 comprising feeding the polyolefin composition and a foaming agent into an extruder to form the foamable composition; and
foaming the foamable composition by extrusion.

* * * * *